United States Patent
Hsiao (10) Patent No.: US 8,421,847 B2
(45) Date of Patent: Apr. 16, 2013

(54) APPARATUS AND METHOD FOR CONVERTING TWO-DIMENSIONAL VIDEO FRAMES TO STEREOSCOPIC VIDEO FRAMES

(75) Inventor: Te-Chi Hsiao, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 364 days.

(21) Appl. No.: 12/784,604

(22) Filed: May 21, 2010

(65) Prior Publication Data

US 2011/0285814 A1 Nov. 24, 2011

(51) Int. Cl.
*H04N 13/00* (2006.01)
(52) U.S. Cl.
USPC .............. 348/42; 348/44; 348/46; 348/51; 353/6; 353/7
(58) Field of Classification Search .......... 348/42, 348/51, 62–60; 353/6, 7; 351/201, 240; 382/232
See application file for complete search history.

(56) References Cited

U.S. PATENT DOCUMENTS

| 6,215,516 B1 * | 4/2001 | Ma et al. .......................... 348/43 |
| 7,161,614 B1 * | 1/2007 | Yamashita et al. .............. 348/42 |
| 2009/0016618 A1 * | 1/2009 | Zhou ............................. 382/232 |

* cited by examiner

*Primary Examiner* — Sath V Perungavoor
*Assistant Examiner* — Nathnael Aynalem
(74) *Attorney, Agent, or Firm* — McClure, Qualey & Rodack, LLP (57) ABSTRACT

An apparatus is provided for converting two-dimensional video frames to stereoscopic video frames, comprising a comparing unit, a temporal transform operator and a spatial transform operator. The comparing unit receives a sequence of two-dimensional video frames and provides a comparison result indicative of temporal difference data for the sequence of two-dimensional video frames. The temporal transform operator is coupled to the comparing unit for modifying the sequence of two-dimensional video frames according to the comparison result. The spatial transform operator is coupled to the comparing unit and the temporal transform operator for generating a stereoscopic frame pair according to each frame of the modified video frames. The stereoscopic frame pair comprises a left-eye video frame and a right-eye video frame for providing visual differences perceived by human eyes.

18 Claims, 7 Drawing Sheets

APPARATUS AND METHOD FOR CONVERTING TWO-DIMENSIONAL VIDEO FRAMES TO STEREOSCOPIC VIDEO FRAMES

BACKGROUND

1. Field

The disclosed embodiments relate to video processing, and more particularly relate to a video processing apparatus which is capable of converting a video stream representing two-dimensional (2D) video frames to a stereoscopic video stream that may be perceived by a viewer from a three-dimensional (3D) perspective, and method thereof.

2. Description of the Related Art

With the development of multimedia applications and the related display technologies, the demand for display technologies capable of generating more specific and realistic images, such as stereoscopic or three-dimensional videos, is becoming increasingly strong. In general, the viewer may perceive a composite image displayed on the screen as a stereoscopic or three-dimensional image based on the viewer's physiological factors of stereoscopic vision, such as visual differences between the respective eyes of the viewer (or so-called binocular parallax), movement parallax, or the like. This is because the scenes of an object sensed by the respective eyes are slightly different.

Conventionally, in order to obtain stereoscopic images having a true three-dimensional view, a dedicated three-dimensional imaging system having at least two spaced-apart cameras is required to recombine simultaneous perspectives captured by each camera. For example, two cameras may be utilized to simultaneously record respective left-eye and right-eye perspectives. Thus, a corresponding stereoscopic or three-dimensional view may be formed according to the two perspectives. However, such a multiple-camera system requires high equipment cost, complicated arrangements, and may introduce problems of synchronizing the cameras to record a scene from different perspectives.

An apparatus and method capable of converting any originally recorded two-dimensional video content into stereoscopic or three-dimensional video content may be required in some circumstances.

BRIEF SUMMARY

An embodiment of an apparatus for converting two-dimensional video frames to stereoscopic video frames includes a comparing unit, a temporal transform operator and a spatial transform operator. The comparing unit receives a sequence of two-dimensional video frames and provides a comparison result indicative of temporal difference data for the sequence of two-dimensional video frames. The temporal transform operator coupled to the comparing unit for modifying the sequence of two-dimensional video frames according to the comparison result. The spatial transform operator coupled to the comparing unit and the temporal transform operator for generating a stereoscopic frame pair according to each frame of the modified video frames. It is noted that the stereoscopic frame pair comprises a left-eye video frame and a right-eye video frame for providing visual differences perceived by human eyes.

Further, an embodiment of the method for converting two-dimensional video frames to stereoscopic video frames includes the following steps. First, a sequence of two-dimensional video frames is received. Next, a comparison result indicative of temporal difference data for the sequence of two-dimensional video frames is provided. The sequence of two-dimensional video frames is then modified according to the comparison result. Finally, a stereoscopic frame pair is generated according to each frame of the modified video frames. It is noted that the stereoscopic frame pair comprises a left-eye video frame and a right-eye video frame for providing visual differences perceived by human eyes.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
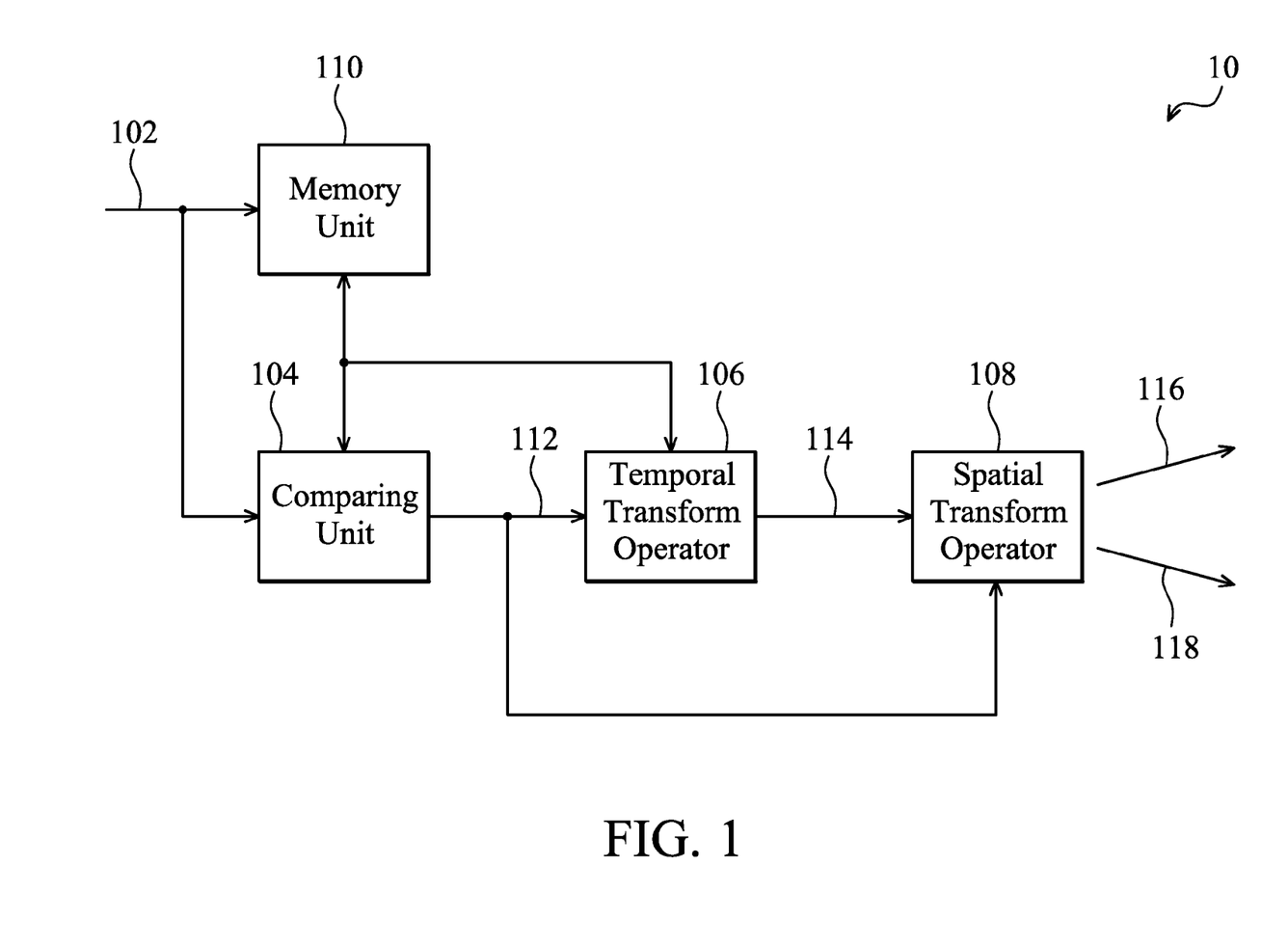
FIG. 1 is a block diagram illustrating an apparatus for converting two-dimensional video frames to stereoscopic video frames according an embodiment of the invention.

FIG. 1 is a block diagram illustrating an apparatus 10 for converting two-dimensional video frames to stereoscopic video frames according an embodiment of the invention.

Referring to FIG. 1, the apparatus 10 of converting two-dimensional video frames to stereoscopic video frames comprises a comparing unit 104, a temporal transform operator 106 and a spatial transform operator 108.

During operation, the comparing unit 104 receives a video content that is two-dimensional, e.g., a sequence of two-dimensional video frames 102. Specifically, the comparing unit 104 provides a comparison result 112 indicative of temporal difference data for the sequence of two-dimensional video frames 102.

According to an embodiment, the comparing unit 104 may perform pixel-based detection to obtain luminance variation or chrominance variation between pixels of a current frame and at least a previous frame. According to another embodiment, the comparing unit 104 may perform block-based or object-based motion detection to obtain motion information associated with the sequence of two-dimensional video frames 102. For example, the motion information may be represented by motion vectors to indicate the speed and direction of movement of a particular object or area within the successive video frames 102. The comparison result 112 compared by the comparing unit 104 is then supplied to the temporal transform operator 106 for further video processing operations.

The temporal transform operator 106 coupled to the comparing unit 104 modifies the sequence of two-dimensional video frames 102 according to the comparison result 112.

In one embodiment, the temporal transform operator 106 may comprise a noise reduction filter (not shown) selected and activated for removing noise, such as spatial noise and temporal noise, from the sequence of two-dimensional video frames 102. For example, when there is not much change in motion information from frame to frame, the noise reduction filter may perform frame averaging to remove temporal noise or random noise within the video frames 102 and obtain a sequence of noise-reduced video frames.

In another embodiment, the temporal transform operator 106 may comprise a deinterlacer (not shown) selected and activated for deinterlacing the sequence of two-dimensional video frames according to the motion information. Alternatively, the deinterlacer may deinterlace the sequence of noise-reduced video frames outputted from the noise reduction filter. It is assumed that the sequence of two-dimensional video frames 102 is interlaced, such as 50 interlaced fields per second and each field having only the odd lines or only the even lines of a video frame. Then, the deinterlacer converts the interlaced sequence of two-dimensional video frames 102 to a 50 Hz progressive scan video stream having frames with all lines of a video frame. Specifically, a number of deinterlacing techniques may be used, e.g., a bob deinterlacer involving spatial interpolation techniques or a weave deinterlacer involving field merging techniques. Note that the progressive scan video stream may be fed back to the noise reduction filter to remove noise from subsequent video frames.

In still another embodiment, the temporal transform operator 106 may comprise a motion judder canceller (not shown) selected and activated for performing frame rate up-conversion of the sequence of two-dimensional video frames 102 with reduced motion judder effects. For example, when the sequence of two-dimensional video frames 102 with a sample rate of 24 frames per second is displayed on a display device with a display frame rate of 60 frames per second, the motion judder canceller converts the sample rate up to the display frame rate by interpolating the position of moving objects and still backgrounds from successive video frames on the basis of the motion information, thereby suppressing motion judder artifacts. Note that the motion judder canceller may perform motion judder cancellation on the progressive scan video stream outputted from the deinterlacer. Note further that frame rate up-conversion may also be implemented either prior or posterior to the deinterlacer.

In addition, it is noted that the video processing operation selected and activated for the sequence of two-dimensional video frames 102 is not limited to noise reduction, deinterlace, or motion judder cancellation, it can be any temporal modification.

In the embodiment of FIG. 1, a memory unit 110 may be further provided for storing the comparison result 112 and at least some of the two-dimensional video frames for facilitating the subsequent video processing operations performed by the temporal transform operator 106.

As shown in FIG. 1, the sequence of modified video frames 114 is then outputted to the spatial transform operator 108. During operation, the spatial transform operator 108 coupled to the comparing unit 104 and the temporal transform operator 106 is provided for generating a stereoscopic frame pair according to each frame of the modified video frames 114. In detail, the stereoscopic frame pair comprises a left-eye video frame 116 and a right-eye video frame 118 for providing visual differences perceived by human eyes.

Figure 2A:
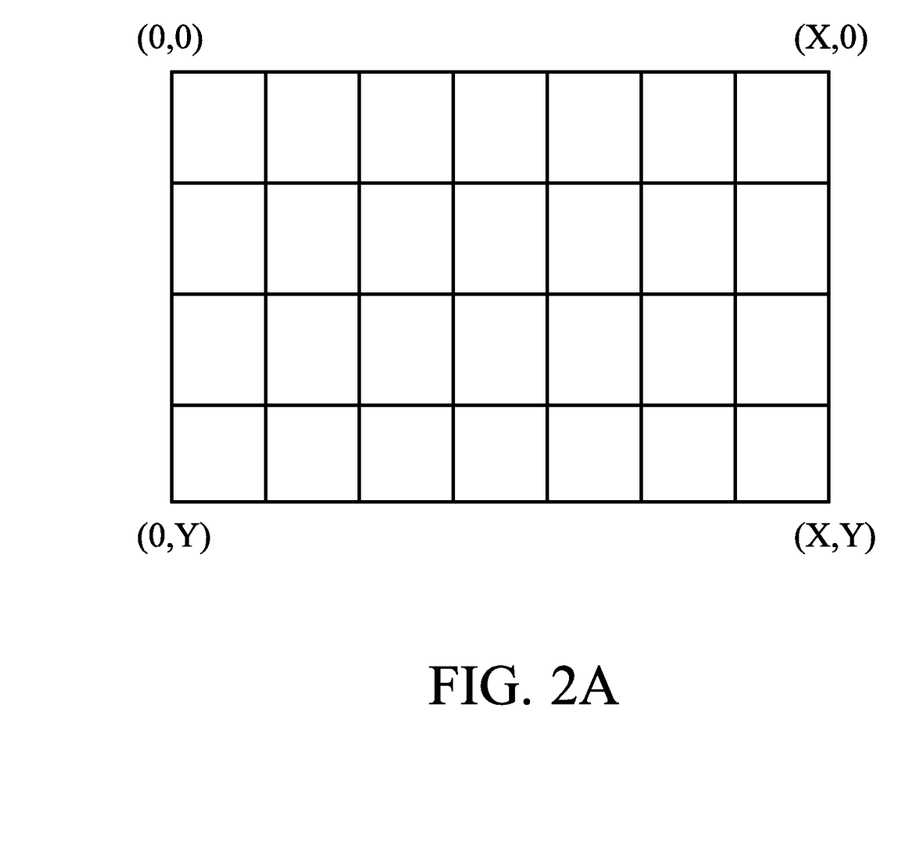
FIGS. 2A and 2B are schematic diagrams illustrating visual differences perceived by human eyes.
Figure 2B:
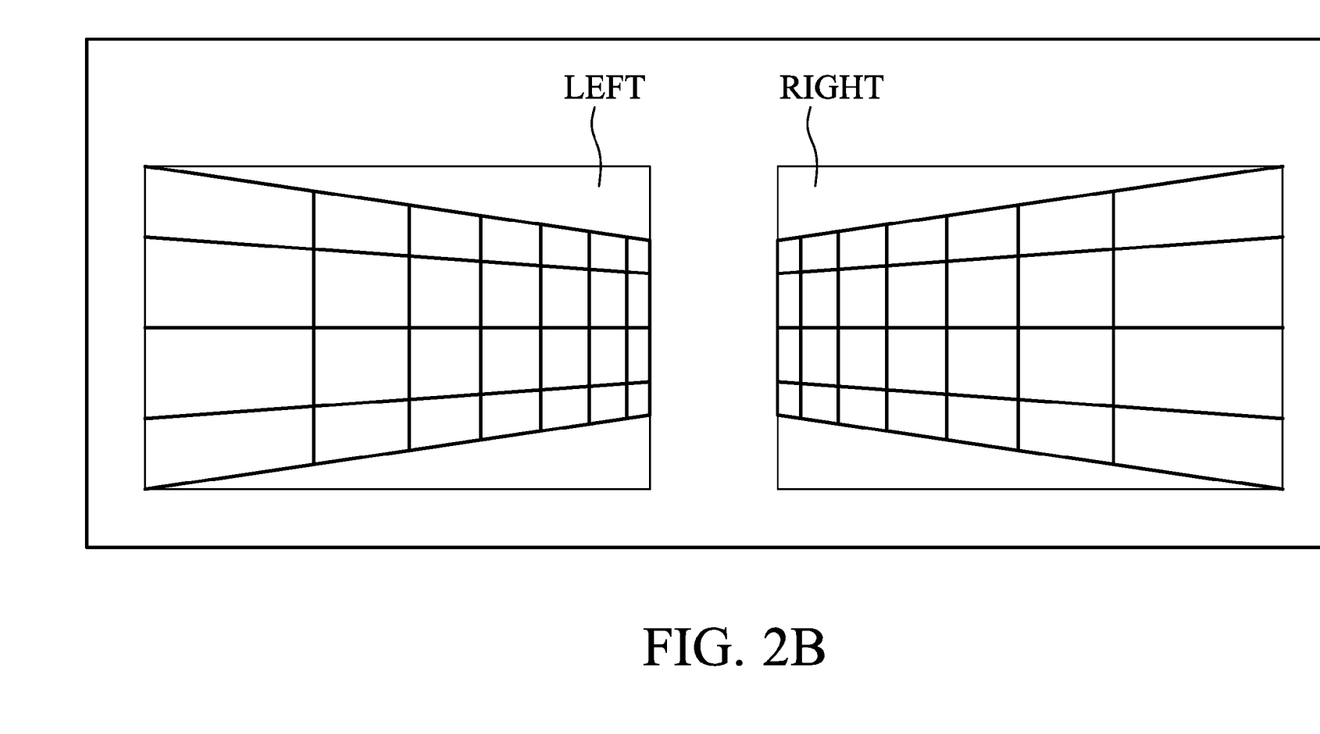

FIGS. 2A and 2B are schematic diagrams illustrating visual differences perceived by human eyes. As shown in FIG. 2A, a rectangular coordinate (X, Y) is defined. Further, as shown in FIG. 2B, the rectangular coordinate (X, Y) respectively perceived by the left eye and the right eye of a viewer becomes two opposite trapezoid-like shapes LEFT and RIGHT. In FIG. 2B, the trapezoid LEFT represents the coordinate (X, Y) in FIG. 2A perceived by the left eye of the viewer and the trapezoid RIGHT represents the coordinate (X, Y) in FIG. 2A perceived by the right eye of the viewer. According to an embodiment, the horizontal position X and the vertical position Y of the two opposite trapezoids LEFT and RIGHT are updated by two specific spatial transform matrices having corresponding scaling factors.

For example, the new vertical position Y may be updated based on the slope of the trapezoid, while the new horizontal position X is required to be updated by a variable scaling factor due to the binocular parallax (i.e., visual differences between human eyes). Specifically, the two specific spatial transform matrices respectively induced by the horizontal parallax and vertical parallax may be derived on the basis of taking a correlation between the left eye and the right eye of the viewer. As such, the specific spatial transform matrices are provided for converting the rectangular coordinate (X, Y) to the pair of two opposite trapezoids LEFT and RIGHT, respectively represented as the left-eye video frame 116 and the right-eye video frame 118, with desired stereoscopic or three-dimensional effects.

Figure 3:
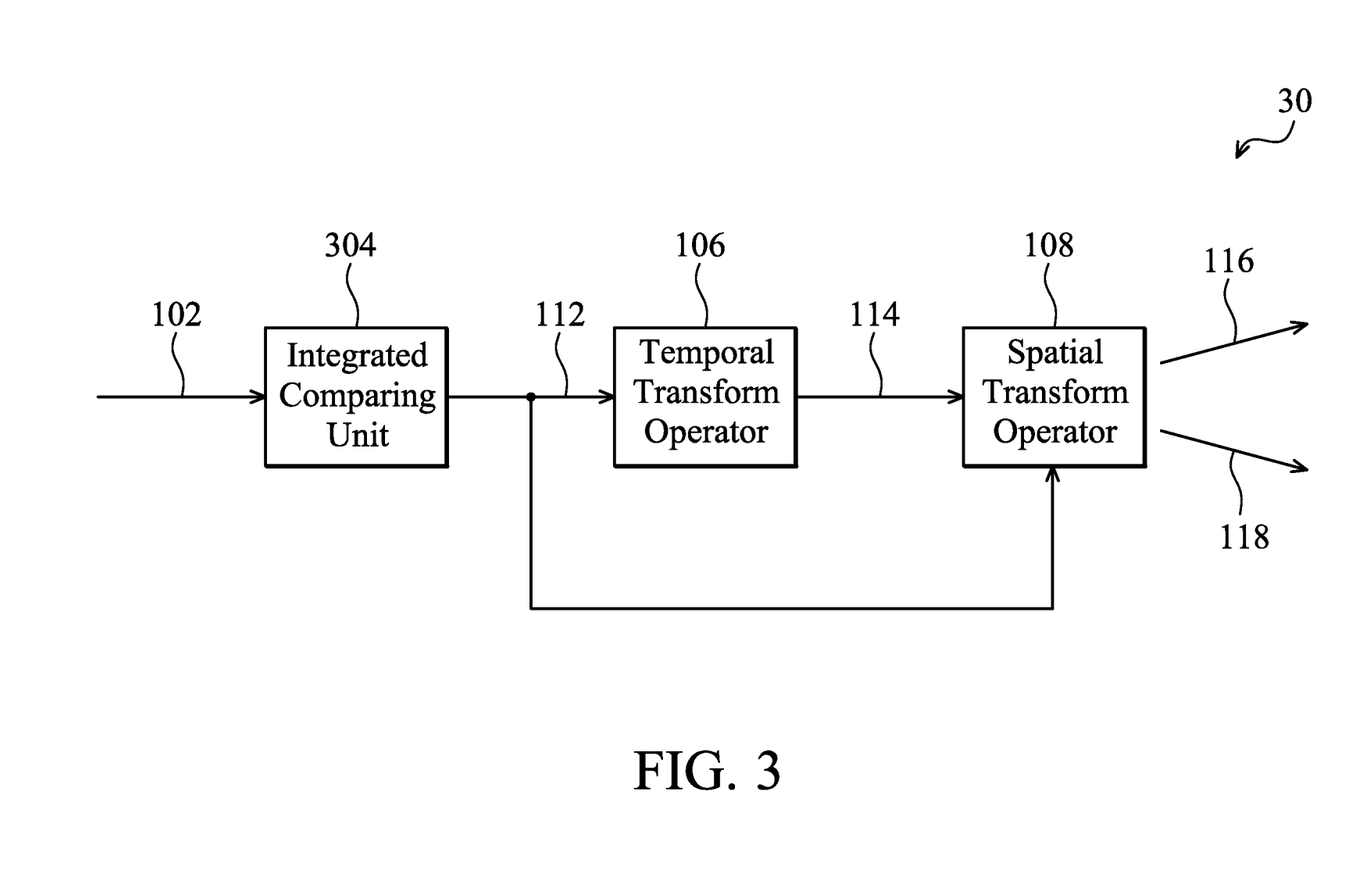
FIG. 3 is a block diagram illustrating an apparatus for converting two-dimensional video frames to stereoscopic video frames according another embodiment of the invention.

FIG. 3 is a block diagram illustrating an apparatus 30 for converting two-dimensional video frames to stereoscopic video frames according another embodiment of the invention.

As shown in FIG. 3, the apparatus 30 is similar to the apparatus 10 in FIG. 1, except for an integrated comparing unit 304. In addition, FIG. 3 uses the same reference numerals as shown in FIG. 1 performing the same functions, and thus further description thereof is omitted for brevity. In this embodiment, the memory unit 110 of FIG. 1 may be integrated into the comparing unit 104 of FIG. 1 as the integrated comparing unit 304, so as to reduce the memory access latency.

Figure 4:
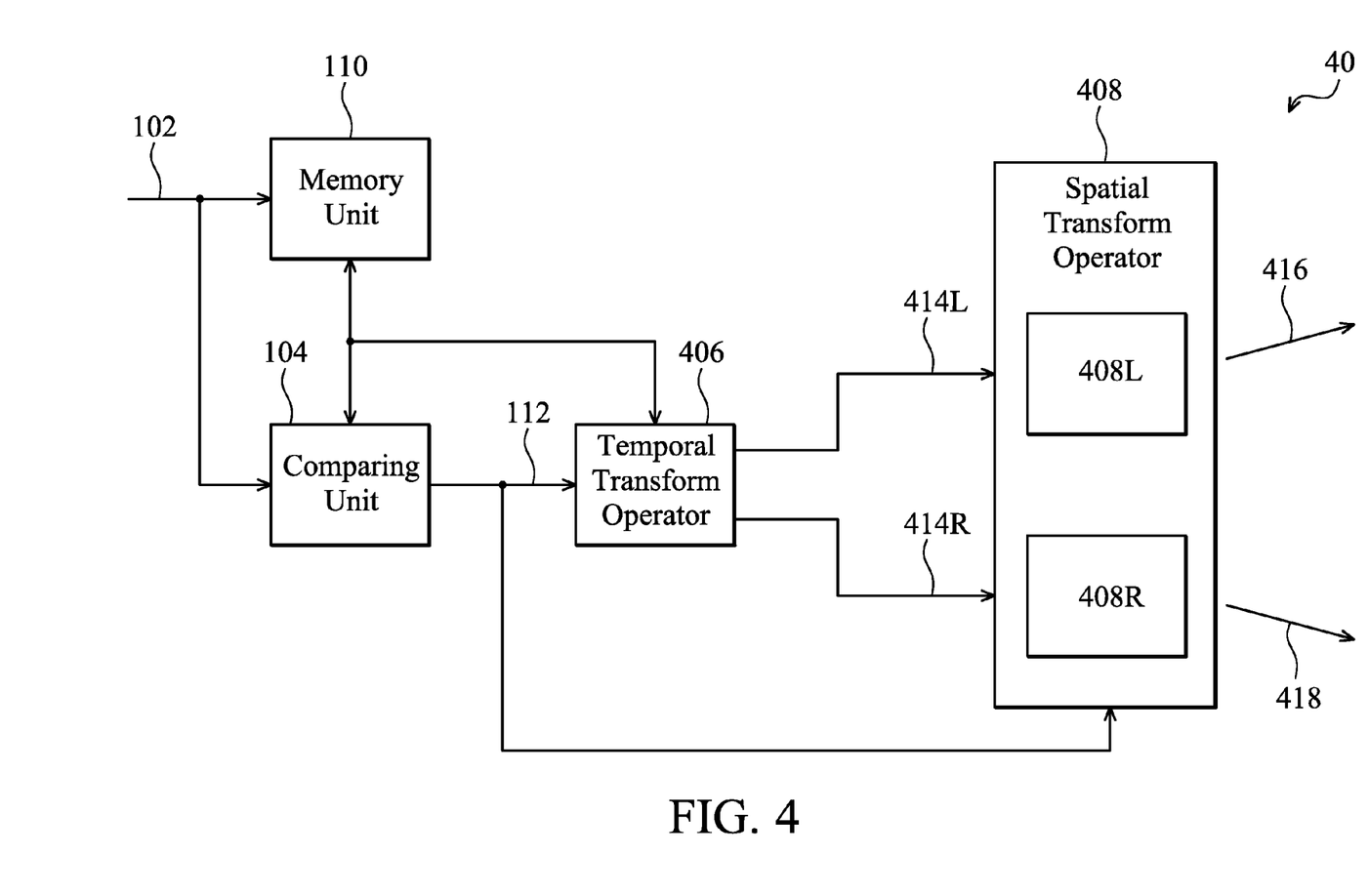
FIG. 4 is a block diagram illustrating an apparatus for converting two-dimensional video frames to stereoscopic video frames according to another embodiment of the invention.

FIG. 4 is a block diagram illustrating an apparatus 40 for converting two-dimensional video frames to stereoscopic video frames according to another embodiment of the invention Referring to FIG. 4, the apparatus 40 is similar to the apparatus 10 in FIG. 1 and further description of the same reference numerals as shown in FIG. 1 is omitted for brevity.

In this embodiment, after a temporal transform operator 406 utilizes the comparison result 112 to modify the sequence of two-dimensional video frames 102 stored with the memory unit 110, the temporal transform operator 406 further generates a virtual frame pair according to each of the modified video frames.

According to one embodiment, the temporal transform operator 406 may directly duplicate each frame of the modified video frames for respectively generating a first video frame 414L (for the left eye of the viewer) and a second video frame 414R (for the right eye of the viewer) of the virtual frame pair.

In this case, the spatial transform operator 408 as shown in FIG. 4 may further comprise a left-eye spatial transform operator 408L specified for the first video frame 414L and a right-eye spatial transform operator 408R specified for the second video frame 414R. During operation, the left-eye spatial transform operator 408L is provided for generating a left-eye video frame 416 of the stereoscopic frame pair according to the first video frame 414L of the virtual frame pair. Additionally, the right-eye spatial transform operator 408R is provided for generating a right-eye video frame 418 of the stereoscopic frame pair according to the second video frame 414R of the virtual frame pair.

Figure 5:
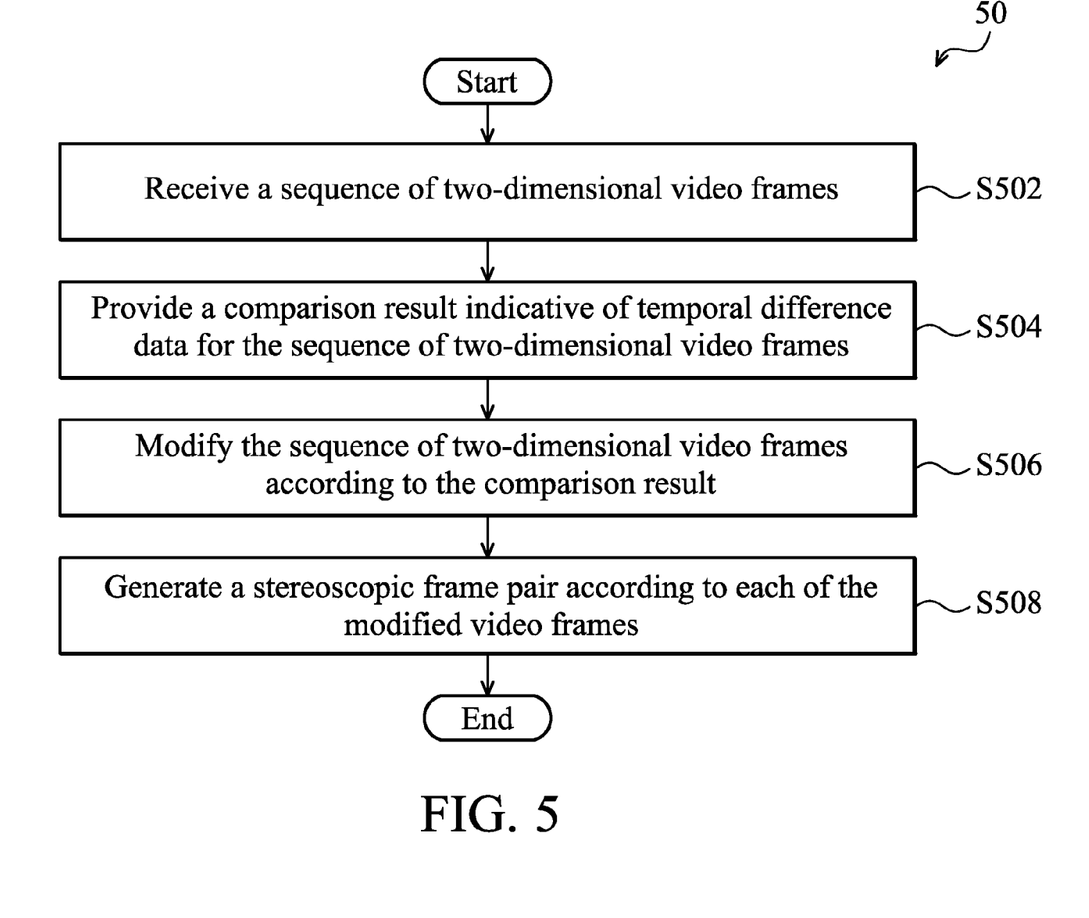
FIG. 5 is a flowchart illustrating a method for converting two-dimensional video frames to stereoscopic video frames according an embodiment of the invention.

FIG. 5 is a flowchart illustrating a method 50 for converting two-dimensional video frames to stereoscopic video frames according an embodiment of the invention. Specifically, the method 50 is provided to support a real-time conversion of an originally recorded two-dimensional video content having the two-dimensional video frames into a stereoscopic or three-dimensional video content. As such, the method 50 advantageously allows a viewer to alternatively appreciate the two-dimensional video content in the form of the stereoscopic or the three-dimensional video content with desired stereoscopic or three-dimensional effects.

Referring to FIGS. 1 and 5, the originally recorded two-dimensional video content having a sequence of two-dimensional video frames 102 is supplied to the comparing unit 104 (step S502).

Next, the comparing unit 104 compares the two-dimensional video frames 102 to provide a comparison result 112 indicative of temporal difference data for the sequence of two-dimensional video frames (step S504).

From aforementioned description, the comparing unit 104 may perform pixel-based detection, object-based motion detection, and/or block-based motion detection according to the subsequent video processing operations. For example, the comparing unit 104 may perform block-based motion detection, e.g., block matching detection, to obtain motion information with respect to motion vectors for indicating the speed and direction of movement of a particular object or area within the successive video frames 102. Subsequently, the comparing unit 104 outputs the comparison result 112 to the temporal transform operator 106.

During operation, the temporal transform operator 106 may use the comparison result 112 to modify the sequence of two-dimensional video frames 102 for one or more video processing operations, but is not limited to, such as noise reduction, deinterlacing, motion judder cancellation, or the like (step S506). Some video processing operations performed by the temporal transform operator 106 have been illustrated previously in detail in the embodiments associated with FIG. 1, and hence, further description thereof is omitted for brevity.

Additionally, it is noted that the memory unit 110 of FIG. 1 may be integrated into the comparing unit 104 of FIG. 1 as the integrated comparing unit 304 of FIG. 3, so as to reduce the memory access latency.

Then, the spatial transform operator 108 generates a stereoscopic frame pair according to each of the modified video frames 114 (step S508). Specifically, the stereoscopic frame pair comprises a left-eye video frame 116 and a right-eye video frame 118 for providing visual differences perceived by human eyes.

From the aforementioned description, as the viewer observes the rectangular coordinate (X, Y) as shown in FIG. 2A with respective left eye and right eye, multiple interrelated stereoscopic views may be perceived with concurrent horizontal parallax and vertical parallax (i.e., visual differences between human eyes), such as the pair of two opposite trapezoid-like shapes LEFT and RIGHT as shown in FIG. 2B. As such, the trapezoidal distortion induced by human eyes must be modified by executing the conversion in the horizontal and vertical direction. More specifically, the rectangular coordinate (X, Y) which represents a two-dimensional video frame may be transformed or converted into the pair of two opposite trapezoid-like shapes LEFT and RIGHT by two specific spatial transform matrices with desired stereoscopic or three-dimensional effects.

According to one embodiment, after the spatial transform operator 108 generates the stereoscopic frame pair, i.e., the left-eye video frame 116 and the right-eye video frame 118, the viewer wearing dedicated glasses, e.g., polarization glasses or shutter glasses, may perceive a composite video frame, which is formatted by the left-eye video frame 116 and the right-eye video frame 118 of the stereoscopic frame pair, as stereoscopic or three-dimensional. According to another embodiment, auto-stereoscopic display devices, rather than dedicated glasses, may be used for displaying the composite video frame that appears in three dimensions.

Figure 6:
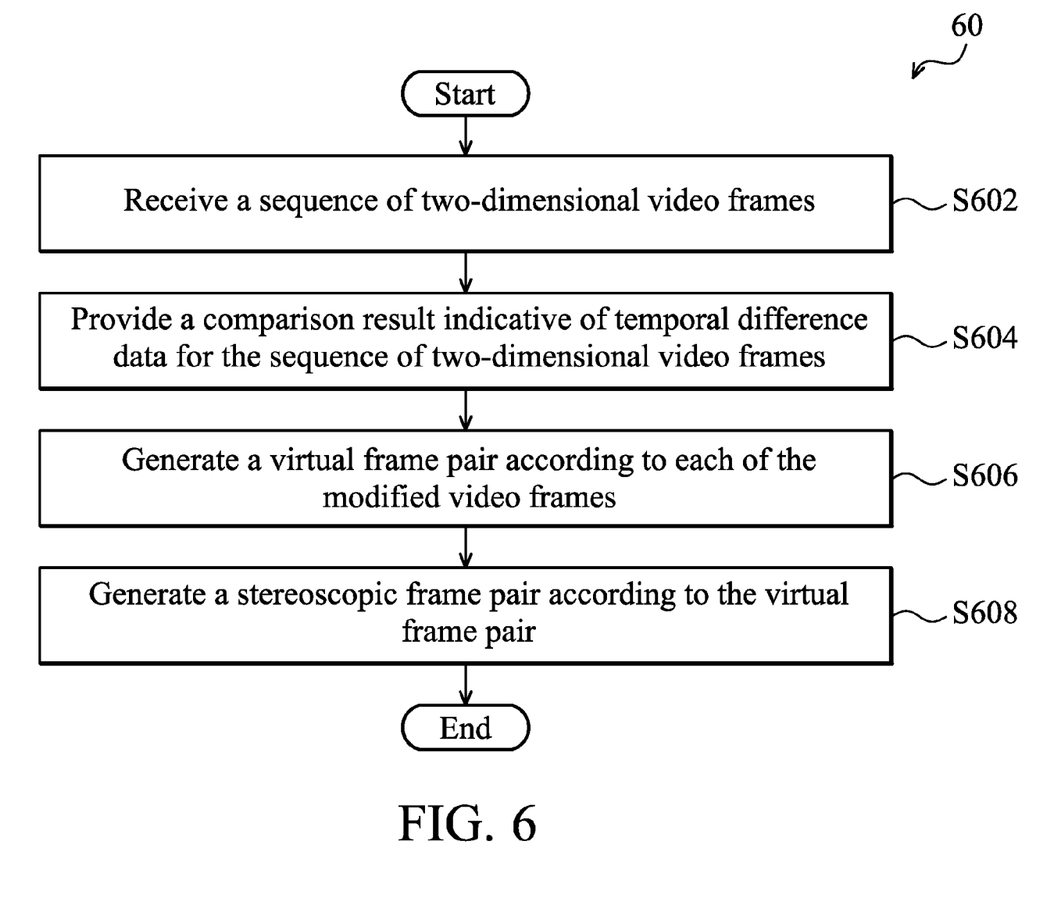
FIG. 6 is a flowchart illustrating a method for converting two-dimensional video frames to stereoscopic video frames according another embodiment of the invention.

FIG. 6 is a flowchart illustrating a method 60 for converting two-dimensional video frames to stereoscopic video frames according to another embodiment of the invention.

Referring to FIGS. 4 and 6, the comparing unit 104 receives the sequence of two-dimensional video frames 102 (step S602). In addition, the sequence of two-dimensional video frames 102 may be stored into the memory unit 110 for facilitating the subsequent video processing operations.

Next, the comparing unit 104 provides the comparison result 112 which indicates the temporal difference data for the sequence of two-dimensional video frames 102 (step S604). As described above, the comparing unit 104 may perform pixel-based detection, object-based motion detection, and/or block-based motion detection for obtaining the comparison result 112, such as luminance variation between pixels, motion information associated with the sequence of two-dimensional video frames 102, etc.

Then, the comparison result 112 is supplied to the temporal transform operator 406 for further modification of the sequence of two-dimensional video frames 102 corresponding to different video processing operations, such as noise reduction, deinterlacing, motion judder cancellation, and so on. Note that the detailed description of video processing operations performed by the temporal transform operator 406 has been illustrated previously in detail in the embodiments associated with FIG. 1, and is not repeated here. Upon the video processing operations of the video frames 102, the temporal transform operator 406 generates the virtual frame pair having a first video frame 414L and a second video frame 414R according to each frame of the modified video frames (step S606). In this illustrated embodiment, the first video frame 414L and the second video frame 414R output to the spatial transform operator 408 are respectively specified for the left eye and the right eye of the viewer.

Moreover, the left-eye spatial transform operator 408L and the right-eye spatial transform operator 408R within the spatial transform operator 408 are provided for generating a stereoscopic frame pair. In this regard, the left-eye spatial transform operator 408L converts the first video frame 414L to the left-eye video frame 416 of the stereoscopic frame pair based on one spatial transform matrix specified for the left eye. Similarly, the right-eye spatial transform operator 408R converts the second video frame 414R to the right-eye video frame 418 of the stereoscopic frame pair based on another spatial transform matrix specified for the right eye (step S608). Furthermore, after the spatial transform operator 408 generates the stereoscopic frame pair, i.e., the left-eye video frame 416 and the right-eye video frame 418, the composite video frame formed by the stereoscopic frame pair 416 and 418 may be perceived by the viewer as stereoscopic or three-dimensional through dedicated glasses or auto-stereoscopic display devices.

The foregoing description of embodiments provides both a feasible and flexible solution for realizing an apparatus, and a method for converting existing two-dimensional video frames to stereoscopic video frames on the basis of temporal domain transform and spatial domain transform, without additional equipment cost for arranging dedicated imaging cameras to record left-eye and right-eye perspectives.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An apparatus for converting two-dimensional video frames to stereoscopic video frames, comprising:
    a comparing unit for receiving a sequence of two-dimensional video frames and providing a comparison result indicative of temporal difference data for the sequence of two-dimensional video frames;
    a temporal transform operator coupled to the comparing unit for modifying the sequence of two-dimensional video frames according to the comparison result; and
    a spatial transform operator coupled to the comparing unit and the temporal transform operator for generating a stereoscopic frame pair according to each of the modified video frames,
    wherein the stereoscopic frame pair comprises a left-eye video frame and a right-eye video frame for providing visual differences perceived by human eyes and the temporal transform operator further generates a virtual frame pair according to each frame of the modified video frames.

2. The apparatus as claimed in claim 1, wherein the comparing unit performs pixel-based detection for obtaining luminance variation or chrominance variation between pixels.

3. The apparatus as claimed in claim 1, wherein the comparing unit performs block-based motion detection for obtaining motion information associated with the sequence of two-dimensional video frames.

4. The apparatus as claimed in claim 1, wherein the temporal transform operator comprises a noise reduction filter for removing noise from the sequence of two-dimensional video frames and obtaining a sequence of noise-reduced video frames.

5. The apparatus as claimed in claim 1, wherein the temporal transform operator comprises a deinterlacer for deinterlacing the sequence of two-dimensional video frames according to the motion information and obtaining a progressive scan video stream.

6. The apparatus as claimed in claim 1, wherein the temporal transform operator comprises a motion judder canceller for performing frame rate conversion of the sequence of two-dimensional video frames with reduced motion judder effects.

7. The apparatus as claimed in claim 1, further comprising:
    a memory unit for storing the comparison result and at least some of the two-dimensional video frames.

8. The apparatus as claimed in claim 1, wherein the temporal transform operator duplicates each frame of the modified video frames to respectively generate a first video frame and a second video frame of the virtual frame pair.

9. The apparatus as claimed in claim 8, wherein the spatial transform operator comprises:
    a left-eye spatial transform operator for generating the left-eye video frame of the stereoscopic frame pair according to the first video frame of the virtual frame pair; and
    a right-eye spatial transform operator for generating the right-eye video frame of the stereoscopic frame pair according to the second video frame of the virtual frame pair.

10. A method for converting two-dimensional video frames to stereoscopic video frames, comprising:
    receiving a sequence of two-dimensional video frames;
    providing a comparison result indicative of temporal difference data for the sequence of two-dimensional video frames;
    modifying the sequence of two-dimensional video frames according to the comparison result;
    generating a virtual frame pair according to each frame of the modified video frames; and
    generating a stereoscopic frame pair according to each of the modified video frames,
    wherein the stereoscopic frame pair comprises a left-eye video frame and a right-eye video frame for providing visual differences perceived by human eyes.

11. The method as claimed in claim 10, wherein the step of providing the comparison result comprises:
    performing pixel-based detection for obtaining luminance variation or chrominance variation between pixels.

12. The method as claimed in claim 10, wherein the step of providing the comparison result comprises:
    performing block-based motion detection for obtaining motion information associated with the sequence of two-dimensional video frames.

13. The method as claimed in claim 10, wherein the step of modifying the sequence of two-dimensional video frames comprises:
    removing noise from the sequence of two-dimensional video frames and obtaining a sequence of noise-reduced video frames.

14. The method as claimed in claim 10, wherein the step of modifying the sequence of two-dimensional video frames comprises:
    deinterlacing the sequence of two-dimensional video frames according to the motion information; and
    obtaining a progressive scan video stream.

15. The method as claimed in claim 10, further comprising:
    performing frame rate conversion of the sequence of two-dimensional video frames with reduced motion judder effects.

16. The method as claimed in claim 10, further comprising:
    storing the comparison result and at least some of the two-dimensional video frames.

17. The method as claimed in claim 10, wherein the step of generating the virtual frame pair comprises:
    duplicating each frame of the modified video frames for respectively generating a first video frame and a second video frame of the virtual frame pair.

18. The method as claimed in claim 17, wherein the step of generating the stereoscopic frame pair comprises:
    generating the left-eye video frame of the stereoscopic frame pair according to the first video frame of the virtual frame pair; and
    generating the right-eye video frame of the stereoscopic frame pair according to the second video frame of the virtual frame pair.

* * * * *